US006892052B2

(12) United States Patent
Kotola et al.

(10) Patent No.: US 6,892,052 B2
(45) Date of Patent: May 10, 2005

(54) RADIO FREQUENCY IDENTIFICATION (RF-ID) BASED DISCOVERY FOR SHORT RANGE RADIO COMMUNICATION

(75) Inventors: Sakari Kotola, Espoo (FI); Holger Hussmann, Tampere (FI)

(73) Assignee: Nokia Corporation, Espoo (FI)

( * ) Notice: Subject to any disclaimer, the term of this patent is extended or adjusted under 35 U.S.C. 154(b) by 289 days.

(21) Appl. No.: 10/105,320

(22) Filed: Mar. 26, 2002

(65) Prior Publication Data

US 2005/0079817 A1 Apr. 14, 2005

(51) Int. Cl.[7] .................................................. H04B 7/00
(52) U.S. Cl. ................... 455/41.2; 455/66.1; 340/10.1; 340/10.42; 705/16
(58) Field of Search ............................. 455/41.2, 41.3, 455/550.1, 41.1, 66.1; 340/10.1, 10.5, 10.42; 705/16, 17, 18

(56) References Cited

U.S. PATENT DOCUMENTS

| | | | |
|---|---|---|---|
| 6,104,333 A | 8/2000 | Wood, Jr. .................... | 341/173 |
| 6,282,407 B1 | 8/2001 | Vega et al. ................... | 455/41 |
| 6,456,039 B1 | 9/2002 | Lauper et al. ............... | 320/107 |
| 2001/0007815 A1 * | 7/2001 | Philipsson ................... | 455/41 |
| 2002/0107742 A1 * | 8/2002 | Breck .......................... | 705/17 |
| 2002/0154607 A1 * | 10/2002 | Forstadius et al. .......... | 370/311 |
| 2003/0008647 A1 * | 1/2003 | Takatori et al. ............. | 455/420 |
| 2003/0114104 A1 * | 6/2003 | Want et al. .................. | 455/39 |

FOREIGN PATENT DOCUMENTS

| | | |
|---|---|---|
| WO | WO 01/39108 A2 | 5/2001 |
| WO | WO 01/45038 A2 | 6/2001 |
| WO | WO 01/45319 | 6/2001 |
| WO | WO 01/45319 A1 | 6/2001 |

OTHER PUBLICATIONS

"Radio Frequency Identification—RF–ID: A Basic Primer", Automatic Identification Manufacturers (AIM) web site (http://www.aimglobal.org), Jan. 5, 2000, ppgs. 1–15.
Bray, et al., "Bluetooth Connect Without Cable", Prentice Hall PTR, ISBN 0–13–066106–6, ppgs. 71–87.
Charles Arehart, et al., "Professional WAP", Wrox Press Ltd., 2000 (ISBN 1–861004–04–1) ppgs. 1–41.
International Search Report (Oct. 17, 2003).

* cited by examiner

Primary Examiner—Vivian Chin
Assistant Examiner—Lewis West
(74) Attorney, Agent, or Firm—Morgan & Finnegan, LLP; Joseph C. Redmond, Jr.

(57) ABSTRACT

A RF-ID based wireless terminal has shortened session set-up and user identification time for conducting transactions with interactive service applications. The wireless terminal includes a terminal identification number and a user identification as a RF-ID tag. A RF-ID reader transmits a RF field for detecting the RF-ID tag in the terminal and provides an output signal when the terminal is within the reader field. The output signal establishes a connectionless communication to an access point or other terminal which initiates a wireless paging operation, in lieu of conducting a terminal discovery process, based upon the content of the RF-ID tag. The terminal initiates a wireless session between the terminal and the access point or terminal for conducting transactions with a service application linked to the access point or terminal.

59 Claims, 12 Drawing Sheets

FIG. 8

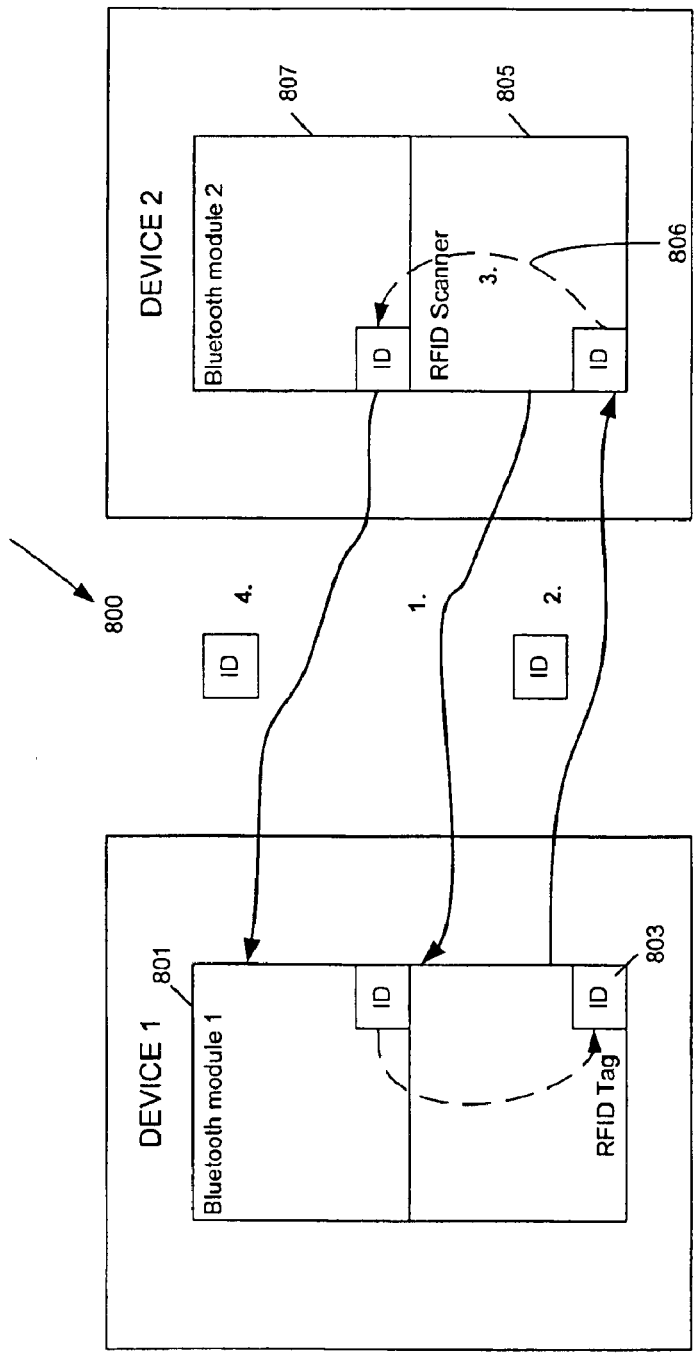

Method for reducing session set up time in wireless short range communication:

- at least part of the ID information of the Bluetooth module 1 is linked to RFID Tag.

- 1 & 2. The at least part of the ID information of the Bluetooth module 1 is transmitted rapidly through a first short range communication channel (RFID) to device 2 based on request transmitted by said device 2 through the first short range communication channel (RFID).

- 3. The at least part of the received ID information of the Bluetooth module 1 is forwarded to Bluetooth module 2 of the device 2.

- 4. Setting up a connection through second communication channel (Bluetooth) by paging for the Bluetooth module 1 using the at least part of the ID information of the Bluetooth module 1.

RADIO FREQUENCY IDENTIFICATION (RF-ID) BASED DISCOVERY FOR SHORT RANGE RADIO COMMUNICATION

BACKGROUND OF INVENTION

1. Field of Invention:

This invention relates to short range communication devices, processes and systems. More particularly, the invention relates to short range devices, processes and systems utilizing radio frequency identification systems for shorter user identification and session setup time for interactive services.

2. Description of Prior Art:

Bluetooth® is a short-range wireless communication system operating at 2.4 GHz and designed to establish connection between two or more devices operating within a ten-meter communication range, for nominal output power, but can be extended up to 100 meters for 100 mW-output power. The details of Bluetooth are described in "The Bluetooth Special Interest Group, Specification Of The Bluetooth System, Volumes 1 and 2, Core and Profiles: Version 1.1, 22nd Feb., 2001, which are fully incorporated herein by reference. To discover another Bluetooth terminal, an inquiry message is transmitted searching for other devices in the vicinity. Any other Bluetooth terminal that is listening by means of conducting an inquiry scan, will recognize the inquiry message and respond. The inquiry response is a message packet containing the responding devices Bluetooth terminal Address (BD_ADDR). The Bluetooth terminal address is a unique, 48-bit IEEE address, which is electronically engraved into each Bluetooth terminal. The address is virtually guaranteed to be completely unique, so much so that it can be reliably associated with the device's user, much as can the user's passport number or social security number. One of the problems of Bluetooth terminals is the long time required for discovery of a Bluetooth terminal, which can be up to 10 seconds. In many applications, the device discovery time is too long and restricts the usage of Bluetooth, particularly for interactive services.

Radio Frequency Identification (RF-ID) is a wireless system that automatically identifies tracks and manages objects via a fast connection between the object and a RF-ID reader. RF-ID principles are described in a publication entitled "Radio Frequency Identification—RF-ID: A Basic Primer", published by the Automatic Identification Manufacturers (AIM) web site (http: //www.aimglobal.org), Oct. 23, 2001 and fully incorporated herein by reference. The object includes a transponder, active or passive, which when in the presence of an electromagnetic zone created by the reader broadcasts an object identity signal. The reader senses and decodes the broadcast signal to identify the object. The object identity is achieved by a connectionless communication that is a connection without a logical connection between the reader and the object. However, the RF-ID reader can not conduct interactive sessions between the object and the reader.

What is needed in the art is a Bluetooth terminal having shortened terminal discovery and user identification time via a connectionless connection to another terminal or access point using RF-ID, the terminal or access point establishing a session enabling the terminal to conduct transactions with an interactive service application.

Prior art related to short range communication systems and RF-ID includes:

1. PCT Publication WO01/39108 A1 discloses a system that includes a mobile communication unit wherein a RF-ID identification module is added between the radio part and an antenna in a mobile telephone that includes a Bluetooth function. The module comprises a mixer for transposing identification messages from identification devices in a 2.45 GHz RF-D system of the backscatter type to a baseband for further processing in a computer part of the unit. The unit may communicate with a super ordinate system, via a standard call channel or Bluetooth channel. The unit is also cabled to send information to the identification devices for alerting or transmitting data, wherein modulation and encoding can be effected in accordance with the Bluetooth standard enabling the mixer to be included as an integral part of a standard Bluetooth radio.

2. PCT Publication WO01/45038 A2, published Jun. 21, 2001, discloses a short-range communication system includes an interrogator, which interrogates multiple transponders located on a person and receives information separately from the transponders. The interrogator and/or the transponders may be held in an article of clothing or in personal effects of the person. The system enables the close worn by a person to communicate with a plurality of items and to obtain useful information. The network system may be configured so that any particular transponder may communicate with another transponder or a group of transponders of other locals to activate functions; cause action to otherwise shared data and/or information.

3. PCT Publication WO01/45319 A1, published Jun. 21, 2001, discloses a first short-range radio link operating within a first link range. The first link is between a stationary unit and a mobile communication device in a wireless network where the stationary unit transmits an interrogation signal to the communication device, via a short-range communication link operating within a second link range, essentially smaller than the first link range. The mobile communication device receives the interrogation signal from the stationary unit and transmits a response signal, including a unique identification number of the mobile communication device to the interrogation signal. The stationary unit receives the response signal and authenticates the identification number. The stationary unit and the mobile communication device establish a connection, via the first short-range radio link.

None of the prior art discloses or suggests a Bluetooth terminal having a RF-ID identification for establishing a connectionless communication with a service application and conducting transactions with the application on a session basis where the connection time and user identification time are shortened relative to the standard Bluetooth terminal discovery process for conducting sessions.

SUMMARY OF THE INVENTION

To overcome limitations in the prior art described above, and to overcome other limitations that will be apparent upon reading and understanding the present specification, the present invention is directed to shorten session set-up and identification time for interactive services over a short range radio link connection, more particularly a Bluetooth connection. The terminal incorporates a RF-ID tag incorporating a Bluetooth terminal serial number and optionally a user ID. The RF-ID tag can be a passive or semi-passive tag. In the case of a semi-passive tag, it is possible to process information before transmission of any messages. This enables transmission of other valuable information such as Bluetooth clock information. If the Clock Offset value is transmitted with Bluetooth serial number, a subsequent paging protocol is faster. When the terminal enters the field of a combined RF-ID reader and Bluetooth access point (RF-ID/BTH), the Bluetooth serial number and other optional parameters are read from the RF-ID tag incorporated into the terminal. The RF-ID reader transfers the device serial number and other optional parameters to the access node. A Bluetooth paging operation can then be initiated by the access node using the Bluetooth serial number received from the RF-ID reader. In response to the page, the terminal performs a connection setup with the access node using normal Bluetooth session set-up procedure. If the Bluetooth clock information is also transmitted, the page can be made even faster, because the access node can use the terminal's clock information in Bluetooth paging procedure. Alternatively, the access node performs a service notification that includes links to local services. By transmitting the user-ID and other optional parameters, the service notification can be personalized. The paging process shortens the session setup time as compared to the normal Bluetooth terminal discovery process for establishing a session. The system can also be used in communication between two Bluetooth terminals if the terminals are respectively equipped with a RF-ID tag and a. RF-ID reader.

In addition to the Bluetooth standard, the invention also applies to other wireless standards. The invention applies, for example, to the IEEE 802.11 Wireless LAN standards, the Japanese 3rd Generation (3G) wireless standard, the various 2G, 2.5 G, and 3G cellular telephone system standards, the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the High Performance Radio Local Area Network (HIPERLAN) standard, and the Multimedia Mobile Access Communication (MMAC) Systems standard of the Japanese Association of Radio Industries and Businesses. For each of these standards, the initialization parameters for establishing a communications session between a terminal and an access point are stored in a RF-ID tag accompanying the terminal. The parameters are transferred to the RF-ID reader at the access point using RF-ID technology, thereby speeding up the process of initialization.

DESCRIPTION OF THE DRAWINGS

The invention will be further understood from a detailed description of a preferred embodiment taken in conjunction with an appended drawing, in which:

FIG. 8 is a representation of a process for reducing session setup time in the Bluetooth network of FIG. 1;

DESCRIPTION OF PREFERRED EMBODIMENT

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
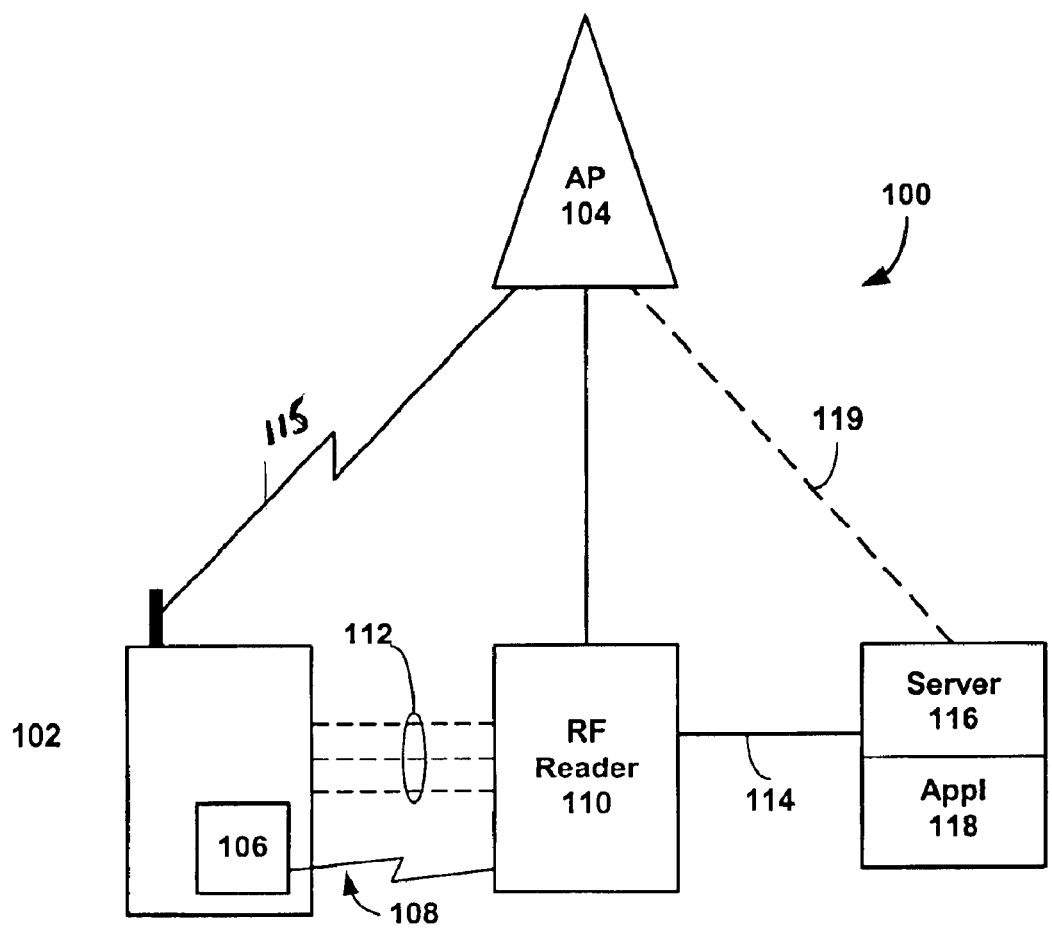
FIG. 1 is a representation of a Bluetooth terminal within the field of RF-ID reader providing a connectionless communication to an access point in a Bluetooth network for conducting transactions between the terminal and a service application on a sessions basis and incorporating the principles of the present invention.

FIG. 1 discloses a system 100 incorporating principles of the present invention for RF-ID based discovery of Bluetooth terminals, which shortens the user identification time and speeds up session setup for interactive services between a terminal and a service application. The terminal 102 incorporates a RF-ID tag 106, which stores ID information, such as the Bluetooth terminal serial number of the terminal 102. The ID information including at least the Bluetooth serial number of the user terminal is transmitted by the RF-ID tag 106 via a radio link 108 to a RF-ID Reader 110.

In one embodiment, the RF-ID tag 106 may be a passive tag, which operates without an internal battery source, deriving the power to operate from the radio field 112 generated by the RF-ID reader 110. The Bluetooth terminal serial number is transmitted by the RF-ID tag 106 to the RF-ID reader 110, and can be forwarded to a server 116. Alternately, the RF-D reader 110 can transfer the identity information to an access point 104, which can forward the identity information to the server 116. The server 116 can use the received terminal serial number or user ID to lookup information about either the user or the terminal 102, and return the accessed information to the access point 104 for transfer to the terminal via radio link 115.

In another embodiment, the RF-ID tag 106 can be a semi-passive or active tag. A semi-passive or active tag may include a read/write storage device powered by an internal battery allowing a greater RF communication range and higher data transmission rates. In the case of a semi-passive tag, it is possible to process information before message transmission. This enables transmission of other valuable information such as the Bluetooth Clock Offset of the terminal 102. If the Clock Offset value of the terminal 102 is transmitted with the Bluetooth serial number, the subsequent Bluetooth paging protocol with the access point 104 is faster.

When the terminal 102 enters the radio field 112 of a combined RF-ID reader 110 and Bluetooth access point 104 (RF-ID/BTH), the Bluetooth serial number and other optional parameters are read by the reader 110 from the RF-ID tag 106. If the terminal has a passive tag there is no option to update the tag information, so the information preferably includes only Bluetooth serial number of the terminal which may be hard-coded within the RF-ID tag already in the terminal manufacturing line. In the case of semi-passive or active RF-ID tag, the tag information can be updated later on, so more information, such as Clock Offset information and User ID information can be maintained in the tag.

Figure 1B:
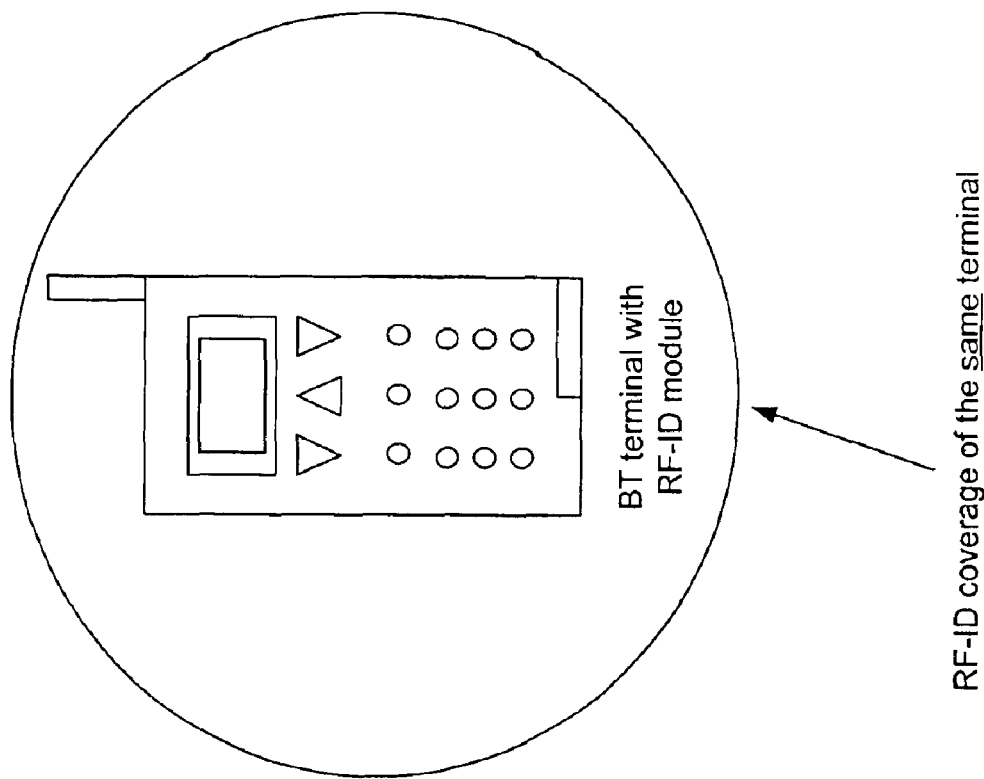
FIG. 1B is a representation of RF-ID coverage of the Bluetooth terminal of FIG. 1A.
Figure 1A:
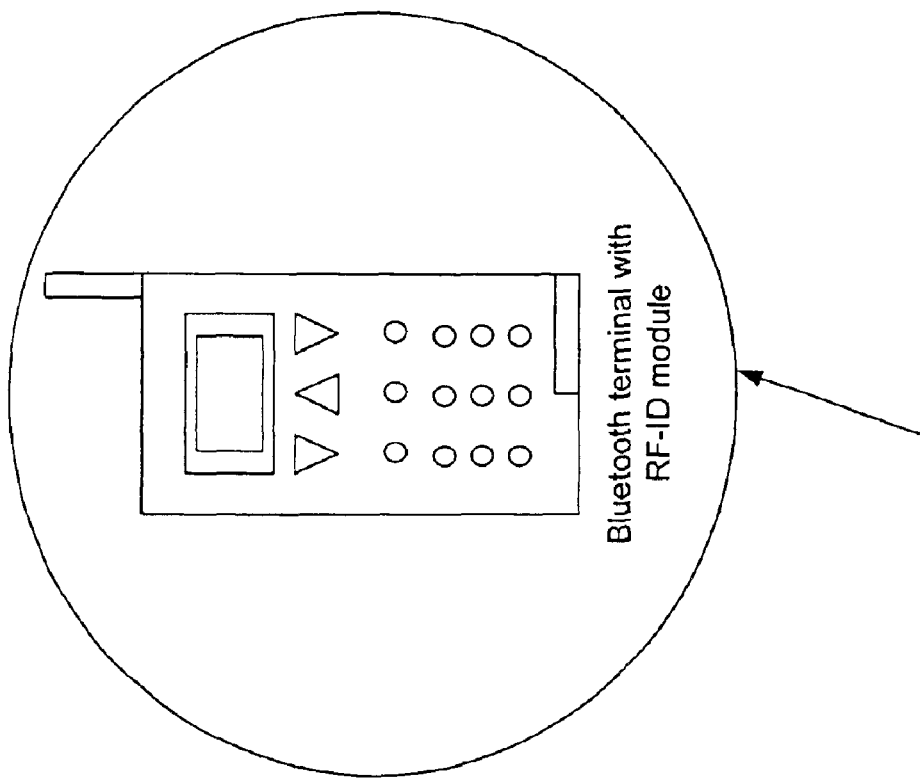
FIG. 1A is a representation of a RF coverage area for a Bluetooth terminal with a RF-ID module.
Figure 1C:
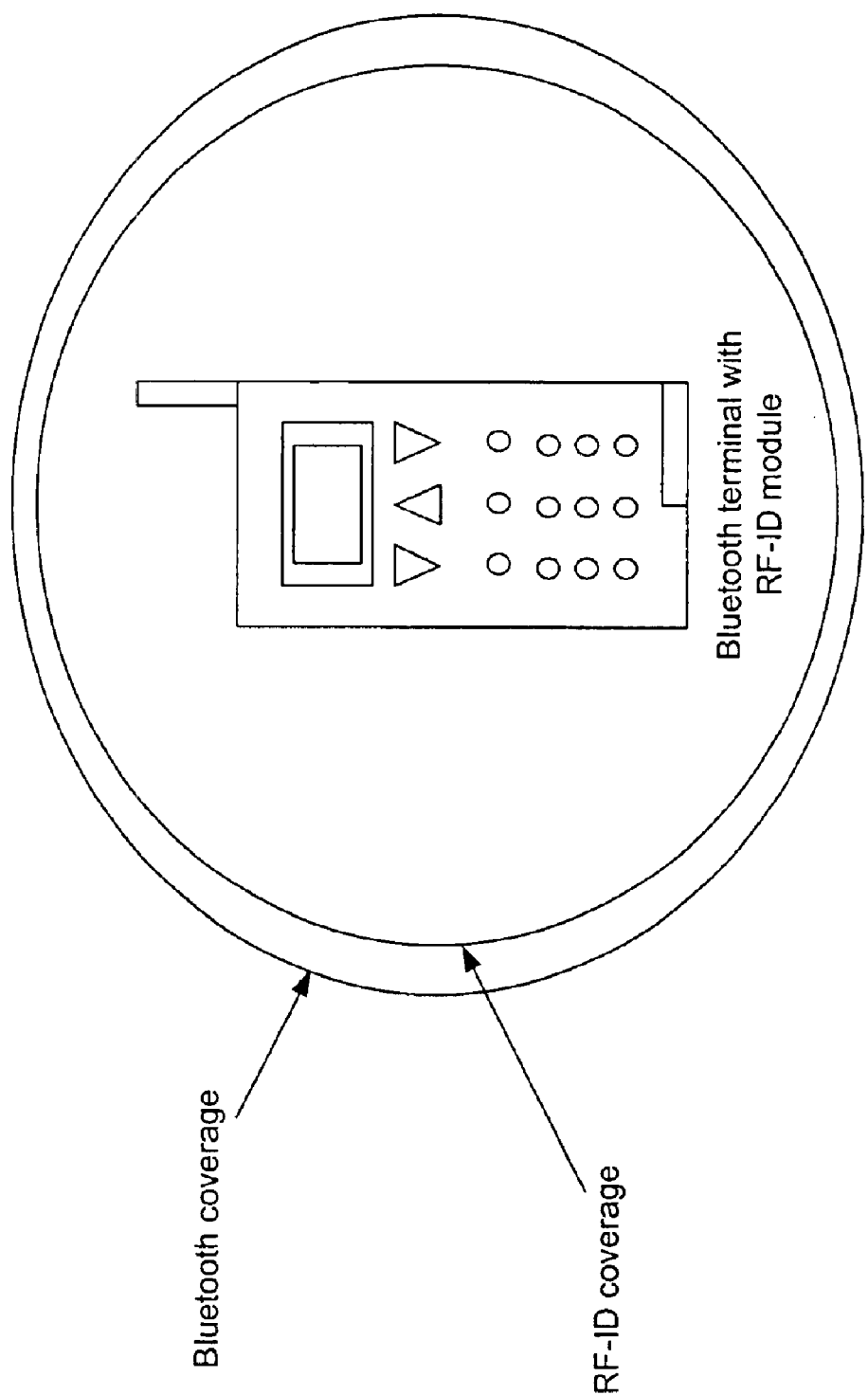
FIG. 1C is a representation of the Bluetooth coverage and RF-ID coverage of the Bluetooth terminal of FIGS. 1A and B.

According to a preferred embodiment of the present invention, the RF coverage area of the RF-ID tag and the RF coverage area of the Bluetooth terminal are substantially the same (or at least in magnitude). FIG. 1A illustrates the Bluetooth RF coverage of the terminal. FIG. 1B illustrates RF-ID coverage of the same terminal. In FIG. 1C, the coverage areas of FIGS. 1A and B are "put together" and are substantially the same (in the optimum case) thereby requiring the RF-ID readers to send interrogation signals having coverage in the same magnitude as that of the Bluetooth terminal coverage and requiring the RF-ID tag to have the same coverage as the terminal. The combined RF-ID reader 110 and Bluetooth access point 104 may also periodically send Bluetooth Inquiry messages to detect the terminal 102. After receiving the Bluetooth serial number and other optional parameters by whatever means (using RF-ID or Bluetooth), the combined RF-ID reader instantly sends a Bluetooth paging message using the received information.

Returning to FIG. 1, the RF-ID reader 110 transfers the device serial number; the terminal Clock Offset value, and other optional parameters including the Clock Offset value depending upon whether the terminal has a passive or a semi-passive RF-ID tag, to the access node 104. The access point now has enough information about the terminal 102 to skip the usual Bluetooth inquiry stage in establishing a Bluetooth connection, and can proceed directly to the Bluetooth paging stage. A Bluetooth paging operation is initiated by the access node 104 using the Bluetooth serial number of the terminal 102 received from the RF-ID reader and possibly the Clock Offset value of the terminal 102. In response to the page, the terminal 102 performs a connection setup with the access point 104 using normal Bluetooth session set-up procedure. Additionally, the access point 104 can send a service notification to the server 116 to access data, such as links to local services. By transmitting user-ID or the serial number of the terminal 102, the service notification to the server 116 can be personalized, and data uniquely associated with the user can be accessed. The RF-ID discovery/paging process shortens the session setup time as compared to the normal Bluetooth terminal discovery process for establishing a session. The system can also be used in communication between two Bluetooth mobile terminals, if the terminals are respectively equipped with a RF-ID tag 106 and a RF-ID reader 110.

The access point 104 uses the information transferred from the RF-ID reader 110 to prepare and send a paging message to the terminal 102. The access point 104 invokes its link controller to enter a page state where it will transmit paging messages to the paged terminal 102 using the access code acquired from the RF-ID tag 106. The terminal 102 is in the paging scanning state and can receive the paging message from the access point 104, which provides the terminal 102 with the access point's clock timing and access code. When the access point 104 sends a paging message to the terminal, a Frequency Hopping Synchronization (FHS) packet which includes the terminal's address is transmitted to enable the terminal 102 to synchronize itself with the access point 104. The terminal 102 responds to the page with an acknowledgement packet, whereupon, the two devices form a synchronous connectionless link (ACL) and the access point 104 and terminal 102 transition into the connection state. Since the access point has initiated the page, it will be the master device and the terminal device will become the slave to the access point. Additional details for establishing the connection between the terminal and the access point are described in "The Bluetooth Special Interest Group, Specification Of The Bluetooth System", Volumes 1 and 2, Core and Profiles: Version 1.1, 22nd Feb., 2001.

The communications between the terminal 102 and access point 104 are passed through the reader 110, via a connection 114 to the server 116, which executes a service application 118. Alternatively, the access point 104 may communicate directly with the server 116 via a wired or wireless connection 119. The terminal 102 and the service application 118 interact, via the standard Bluetooth message protocols described in "The Bluetooth Special Interest Group, Specification Of The Bluetooth System", Volumes 1 and 2, Core and Profiles: Version 1.1, 22nd Feb., 2001.

The terminal messages are processed by the application 118. In one embodiment the messages between the terminal 102 and the application 118 are exchanged using the Wireless Access Protocol (WAP), allowing mobile terminals to use data services and providing access to the Internet. WAP supports a client/server architecture. WAP enabled client devices can use micro browsers, which are specially designed web browsers that fit into mobile devices, such as a mobile cellular handset. A micro browser is designed to work with a small screen and use less memory than a browser running on a desktop computer. Additional information about the WAP standard and the WAP client/server architecture can be found in the book by Charles Arehart, et al. entitled, "Professional WAP", published by Wrox Press Ltd., 2000 (ISBN 1-861004-04-1).

Figure 2:
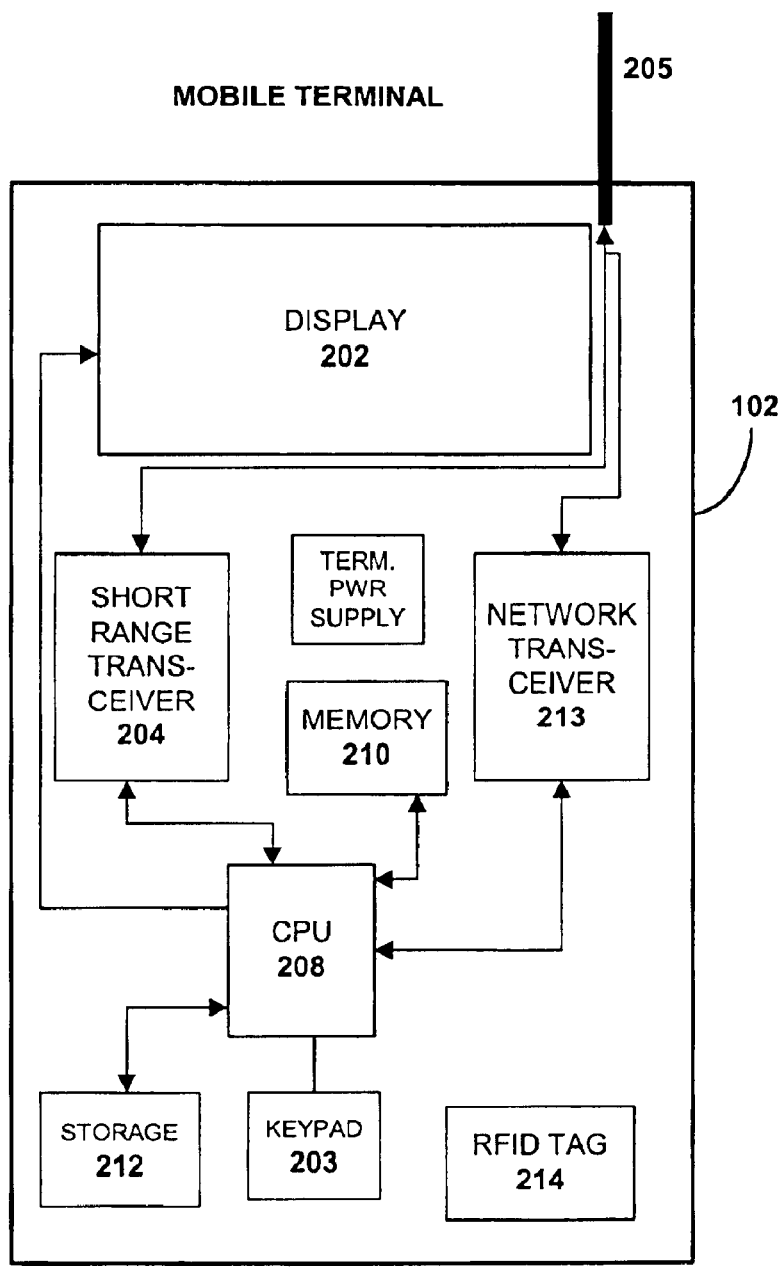
FIG. 2 is a representation of a Bluetooth terminal, including a passive RF-ID tag, according to one embodiment of the invention.

FIG. 2 is a functional representation of the mobile terminal 102 according to one embodiment of the present invention. Included in the terminal 102 is a display 202 for displaying messages received from the access point 104 or other terminal and entering messages and data via a keypad 203 for transmission to the access point or other terminal. A short-range transceiver 204 linked to an antenna 205 provides communication over a Bluetooth network for messages and data. It should be noted that the antenna used in short-range communication is not the same antenna used in communication with a mobile network. The transceiver 204 interacts with a CPU 208 for implementing Bluetooth protocols and processing messages exchanged between the access point 104 and the terminal 102. The CPU 208 is linked to a volatile or dynamic random access memory (dram) 210 containing an operating system for processing messages, protocols, etc The CPU 208 executes programs stored in a non-volatile or read only memory 212 providing instructions for managing and controlling the operation of the terminal 102. The CPU 208 is also connected to a cellular telephone network transceiver 213 for interacting with a cellular network, such as the Global System Mobile (GSM) and the like via the antenna 205. In accordance with the invention, a RF-ID tag 214 is installed in the terminal 102. In one embodiment, the tag may be a passive device which operates without an internal battery source, deriving the power to operate from the field 112 generated by the RF-ID reader 110 which is inductively coupled to the passive tag. Passive tags have typically a shorter reading range and require a higher-powered RF-ID reader 110. Passive tags are also constrained in their capacity to store data and in the ability to perform well in a noisy electromagnetic environment. Passive tags may contain varying amounts of information ranging from a small storage holding only an ID number to a 128 k byte memory sufficient to hold a serial identification number and parity bits. The RF-ID reader 110 communicates with the RF-ID tag 214 through the use of RF energy. The transferred data between the RF-ID tag 214 and the RF-ID reader 110 requires the data to be modulated on a carrier wave. Carriers operate in several frequency bands ranging from 100–500 kHz to 2.4–5.8 GHz. Modulation of the carriers relies upon Amplitude Shift Key (ASK), Frequency Shift Key (FSK) and Phase Shift Key (PSK).

Figure 2A:
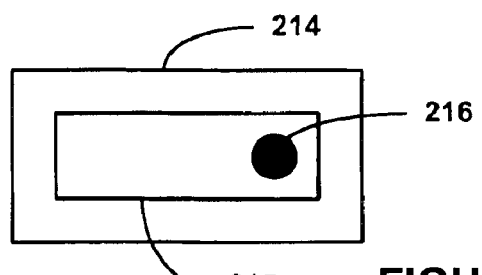
FIG. 2A is a representation of the passive tag of FIG. 2.

FIG. 2A shows the passive RF-ID tag 214 in more detail. According to one embodiment, the tag comprises a radio frequency ID transponder 215, which conforms to the principles of RF-ID technology. A tag antenna 216 is connected to the transponder 215, typically a microchip using well-known coil-on-chip technology. The chip may include a user programmable E-PROM incorporating a user identification and Bluetooth serial number (BT_ADDR). The RF-ID tag 214 is capable of receiving an interrogation signal from the RF-ID reader 110 (see FIG. 1) and separating the RF energy from the received signal. The energy captured by the antenna 216 is analyzed by the microchip and is sufficient to provide a response signal to the RF-ID reader 110. The response signal includes, at least, the Bluetooth serial number for transfer to the access point 104 to initiate a paging operation for the terminal 102.

Figure 3:
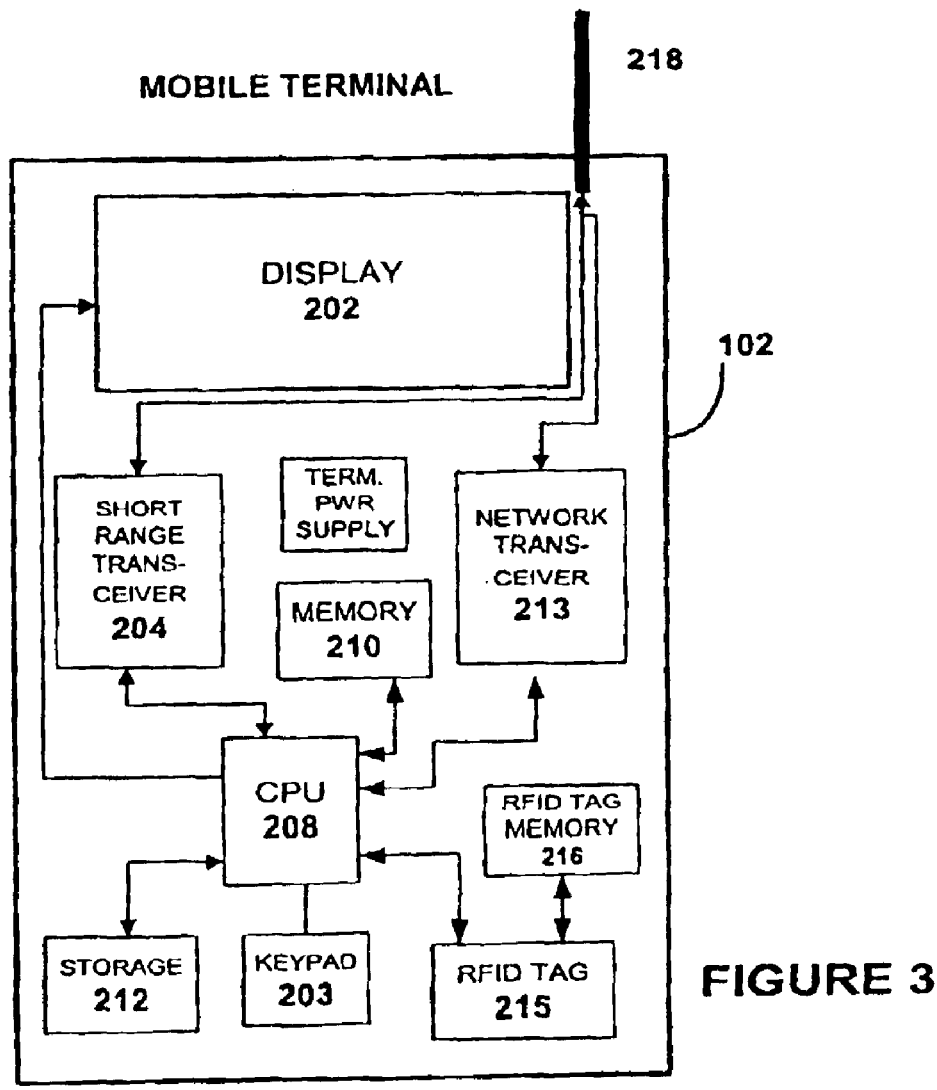
FIG. 3 is a representation of a Bluetooth terminal, including a semi-passive RF-ID tag, according to one embodiment of the invention.

FIG. 3 discloses the terminal 102 of FIG. 2, except that it substitutes a semi-passive or active tag 215 for the passive tag 214. The RF-ID tag 215 may be a read/write device powered by an internal battery allowing greater communication range and higher data transmission rates. The RF-ID tag 215 is connected to a RF-ID memory 216, which may be a random access memory and/or a read-only non-volatile memory. The random access memory facilitates temporary data storage during reader interrogation and response. The read-only memory stores the operating system and contains instructions related to terminal operation. The RF-ID tag 215 is connected to the CPU 208 for receiving the Bluetooth Clock Offset data of the terminal 102 and other possibly stored data required by the access point 104 in establishing a Bluetooth connection. In the case of a semi-passive RF-ID tag, the tag after receiving an interrogation signal may activate the Bluetooth module of the user terminal and set it to page scanning mode.

Figure 3A:
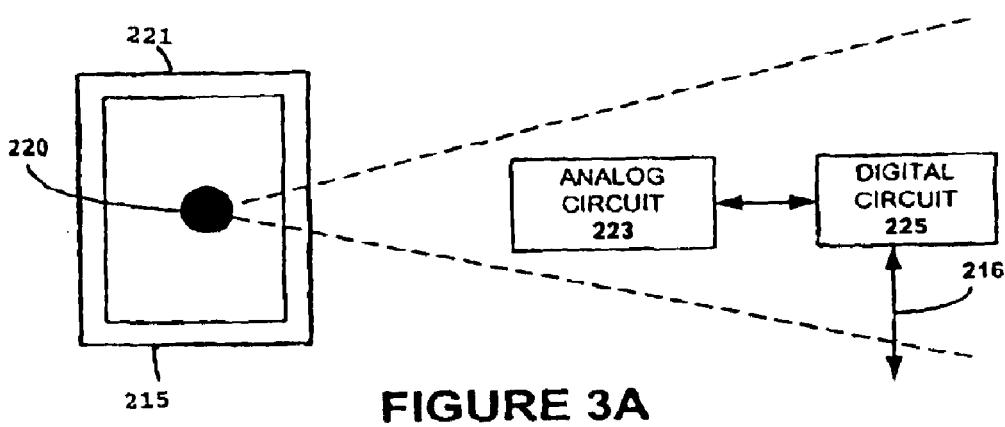
FIG. 3A is a representation of the semi-passive or active tag of FIG. 3.

FIG. 3A shows the RF-ID semi-passive tag 215 in greater detail. An antenna film or coil 220 is connected to a microchip 221 including a power supply (not shown) and analog circuit 223 for converting the RF signals from the RF-ID reader 110 into digital signals for processing by digital circuitry 225 in reading and writing data into the tag memory 216. The tag 215 communicates with the CPU 208 for updating information within the tag, e.g. Clock Offset information. Also, The tag 215 may allow the RF-ID reader 110 to alter the data stored in the RF-ID tag 215 by writing into and reading from the tag memory 216.

Figure 4:
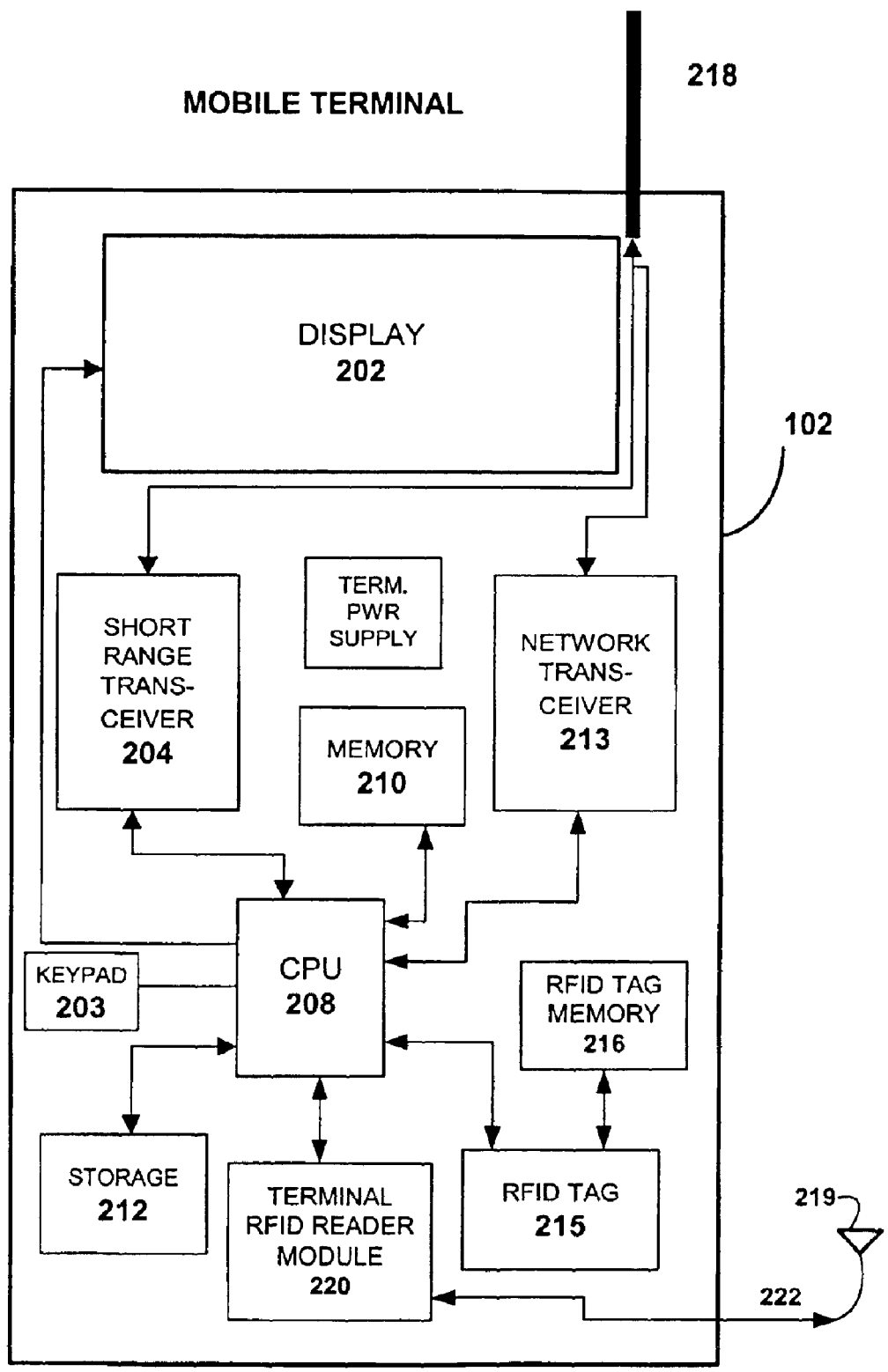
FIG. 4 is a representation of Bluetooth terminal including a RF-D reader module for exchanging information with other RF-ID equipped devices according to one embodiment of the invention.

FIG. 4 shows the terminal 102 of FIG. 3 further including a terminal RF-ID reader module 220 connected to the CPU 208. The terminal 102 may use the reader module 220 using e.g. an internal battery (not shown) as a power source to transmit an interrogation signal via the antenna 219 for receiving the Bluetooth serial number and possibly other information, such as Bluetooth Clock Offset information of other terminals within proximity to the reader module 220. The module disables the RF-ID tag 215 when sending the interrogation signals to other handheld terminals. The electromagnetic coupling of the terminal 102 and the other terminals and the RF-ID reader 110 allows non-line-of-sight communication between the terminals and with the RF-ID reader.

Figure 5:
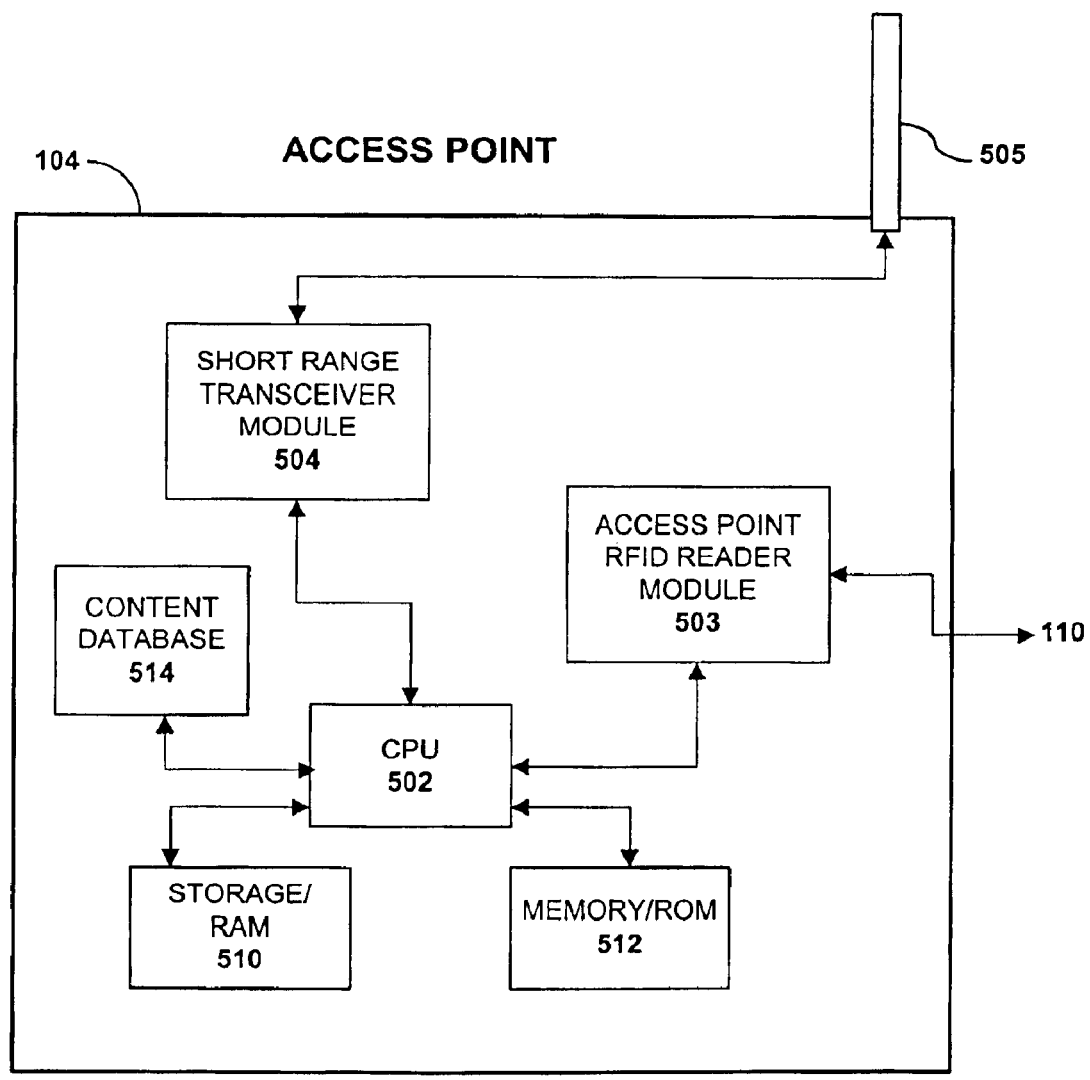
FIG. 5 is a representation of an access point in the system of FIG. 1, according to one embodiment of the invention.

FIG. 5 is a representation of the access point 104 according to one embodiment of the invention. The access point RF-ID module 503 is connected to the RF-ID reader 110. The access point RF-ID module 503 transfers the Bluetooth serial number and Bluetooth Clock Offset information received from the terminal 102, to the CPU 502. The CPU 502 controls a short-range transceiver module 504 for initiating Bluetooth inquiry and paging processes with the terminal 102, via an antenna 505. The CPU 502 is further connected to storage RAM 510 and the read-only memory 512, which provide the connections and protocols to enable the terminal 102 to interact with a content database 514. The user at terminal 102 interacts with the content database 116 (See FIG. 1) using the WAP protocol. At the conclusion of the user's session with the content database, the terminal-to-access point connection is dropped.

Figure 6:
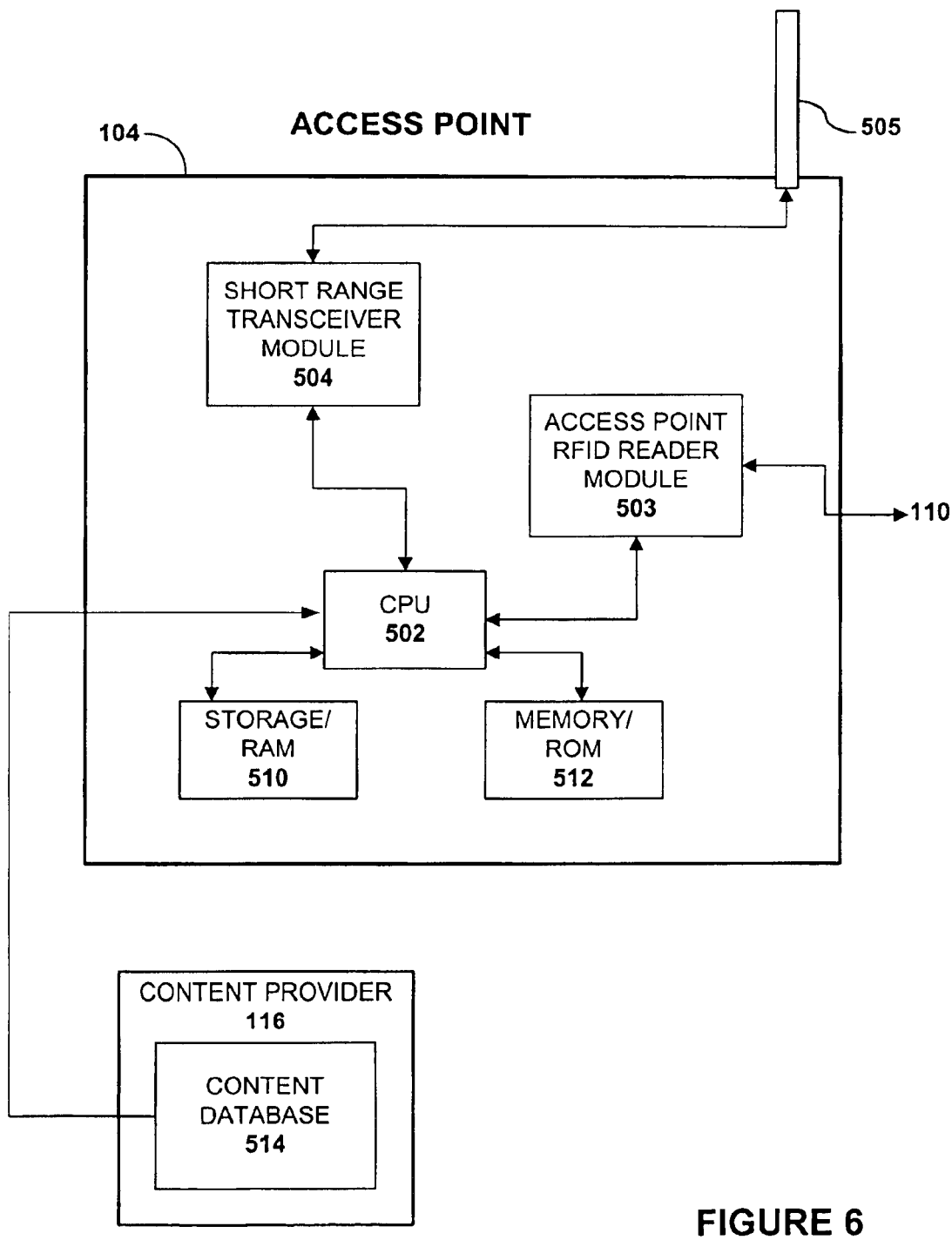
FIG. 6 is a representation of the access point of FIG. 5 coupled to a content provider for conducting interactive services, according to one embodiment of the present invention.

FIG. 6 discloses the access point of FIG. 5 in which the CPU 502 is linked to the remote content provider 116 (See FIG. 1) including the content database 514. The CPU 502 implements terminal-to-content provider signaling using program instructions stored in the memory/ROM 512, after establishing a connection with the terminal 102 using the access point RF-ID module 503 input.

Figure 7:
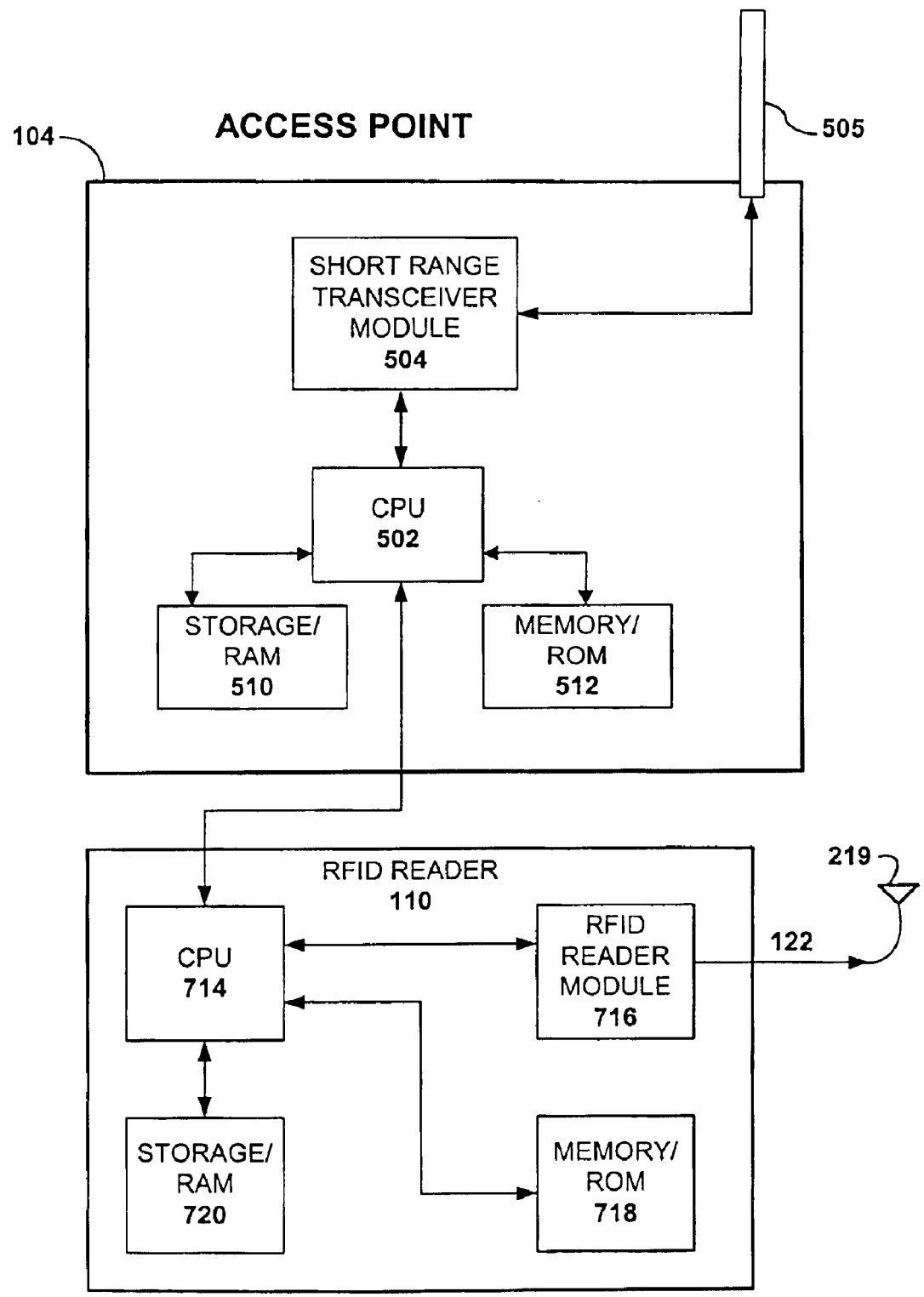
FIG. 7 is a representation of an access point of FIG. 5 coupled to the RF reader providing terminal tag information for establishing a session with the terminal of FIGS. 2 or 3, according to one embodiment of the invention.

FIG. 7 shows the RF-ID reader 110, connected to the access point 104 via a connection 710, according to one embodiment of the invention and transferring the Bluetooth serial number and possibly the Bluetooth Clock Offset information received from the terminal 102 via the antenna 219. The CPU 502 receives the demodulated serial number signal and clock information generated by the RF-D reader module 716 based upon the connectionless communication between the terminal 102 and the RF-ID reader 110. The CPU 714 packetizes the Bluetooth serial number and Bluetooth Clock Offset information for transfer over line 710 to the access point 104 using programs available in the memory 718. The access point 104 initiates the Bluetooth paging process in lieu of the Bluetooth inquiry process and the access point serves as the master device based upon the user identification, terminal serial number and clock information. The clock information allows the access point to speed up the connection establishment with the mobile terminal in establishing a session with the terminal 102 even more. By replacing the possibly time-wasting Inquiry procedure with faster RF-ID identification method session set-up time is shortened and also Bluetooth master-slave switching step is eliminated because the access point automatically becomes the master in response to initiating the paging. Alternatively the access point 104 may send a service notification message including links to local services as described in copending application Ser. No. 09/985,044, filed Nov. 1, 2001, assigned to the same assignee as that of the present invention and fully incorporated herein by reference.

FIG. 8 is a representation of a session setup 800 for the system of FIG. 1, where the device 1 and device 2 are portable devices and device 2 serves as the access point. Device 1 includes a Bluetooth terminal 801 and a RF-ID tag 803. The device 2 includes a RF-ID scanner 805 coupled via scanner channel 806 to a Bluetooth module 807 serving as the access point for the system. In step 1, The device RF-ID scanner 805 energizes the RF-ID tag 803 of device 1 and in step 2 at least a portion of the device 1 ID information is transmitted, via the RF-ID scanner channel 806 to device 2. The received ID information of the device 1 module is forwarded to the device 2 module via the scanner channel 806 in step 3. The device 2 module sets up a connection through a Bluetooth channel to page the Bluetooth module 801 using the ID information of the Bluetooth module, plus other module 1 identification stored in device 2.

The paging process can be accelerated when the device 1 transmits the terminal clock information in the response to the device 2 scan of the device 1 tag information. Where the terminal clock time is provided with the tag information, the paging operation scan eliminates the random backup time and the master slave switch time, as described in Bray, et al., "Bluetooth Connect Without Cable", at pg. 73–85.

Figure 9:
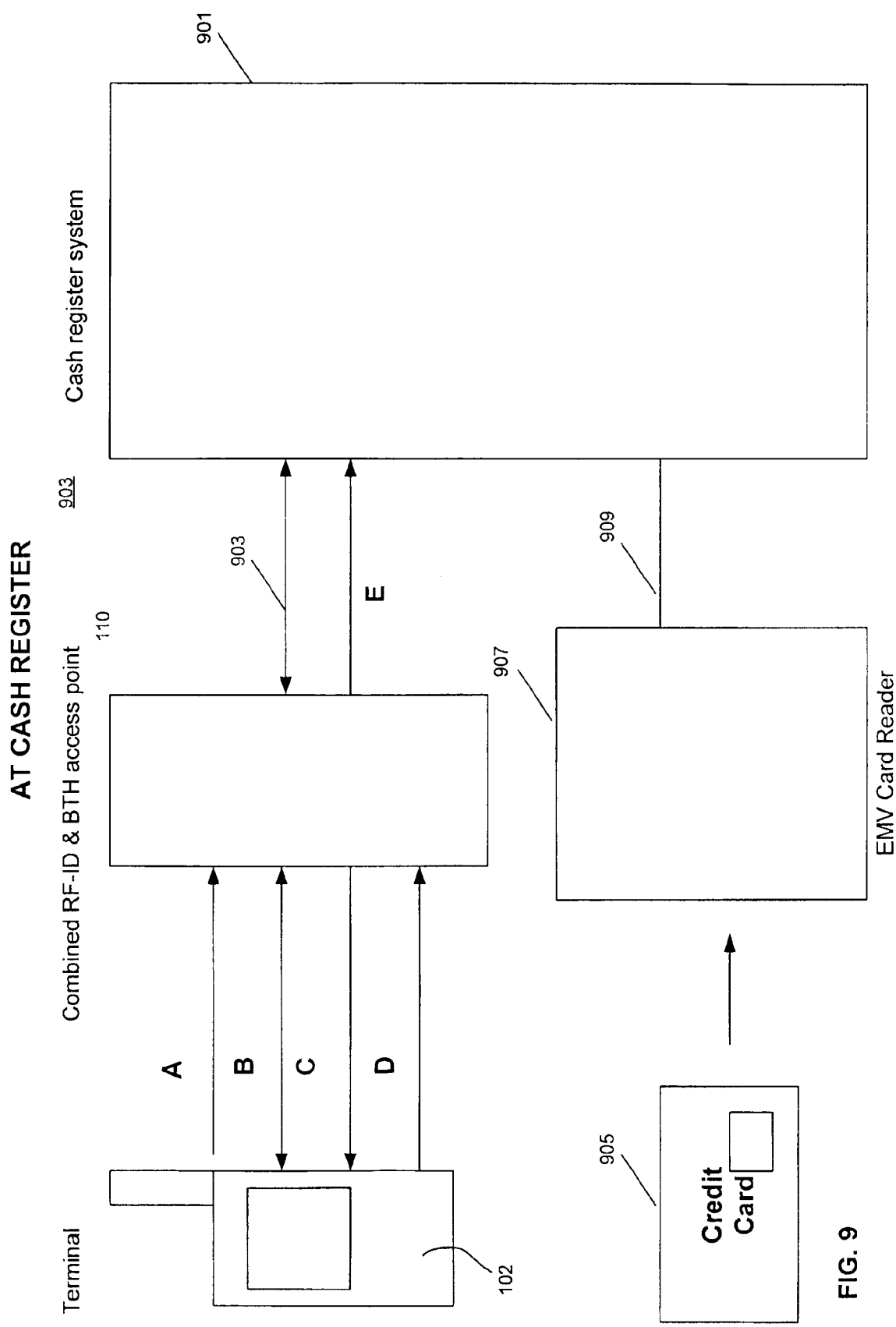
FIG. 9 is a representation of a process for conducting a cash transaction or a credit card transaction with a user in the system of FIG. 1, according to one embodiment of the invention.

FIG. 9 describes a service scenario 900 for a cash register transaction initiated by the terminal 102 with a cash register system 901 connected to the access point by a connection 903, according to one embodiment of the invention.

In step A, the terminal 102 is subjected to a RF field by a reader/Bluetooth access point 110 and the Bluetooth terminal serial number and user credit card number 905 are transferred to the reader using the RF-ID inductive coupling or electromagnetic wave propagation technology, previously described in conjunction with FIGS. 2, 3 and 4. Alternatively, the credit card number may be inputted to a card reader 907 coupled to the cash register system 901 via connection 909.

In step B, the terminal user identification and serial number are used by the access point in a paging operation to establish a session with the terminal.

In step 6, the access point pushes a PIN request to the terminal over the air-link interface. The PIN request may contain more information about the payment transaction. For example, the quantities, type and cost of the merchandise involved in the cash register transaction could be provided.

In step D, after the user has inputted the PIN number to the terminal display, the terminal sends the PIN number to the access point via the Bluetooth connection.

In step E, the terminal information is transferred via the access point to the cash register system for processing and completion of the transaction in step 6.

The cash register scenario assumes a passive tag for the generation of the user identification and Bluetooth terminal serial number. A semi-passive or active tag can provide a response to the access point, including the clock information of the terminal. When the terminal clock time is provided, the access point serves as the master device and eliminates the random backup time that other wise would be required by the device in an inquiry or discovery process. Further the master-slave switch time is eliminated in establishing a logical connection between the access point and the terminal.

Figure 10:
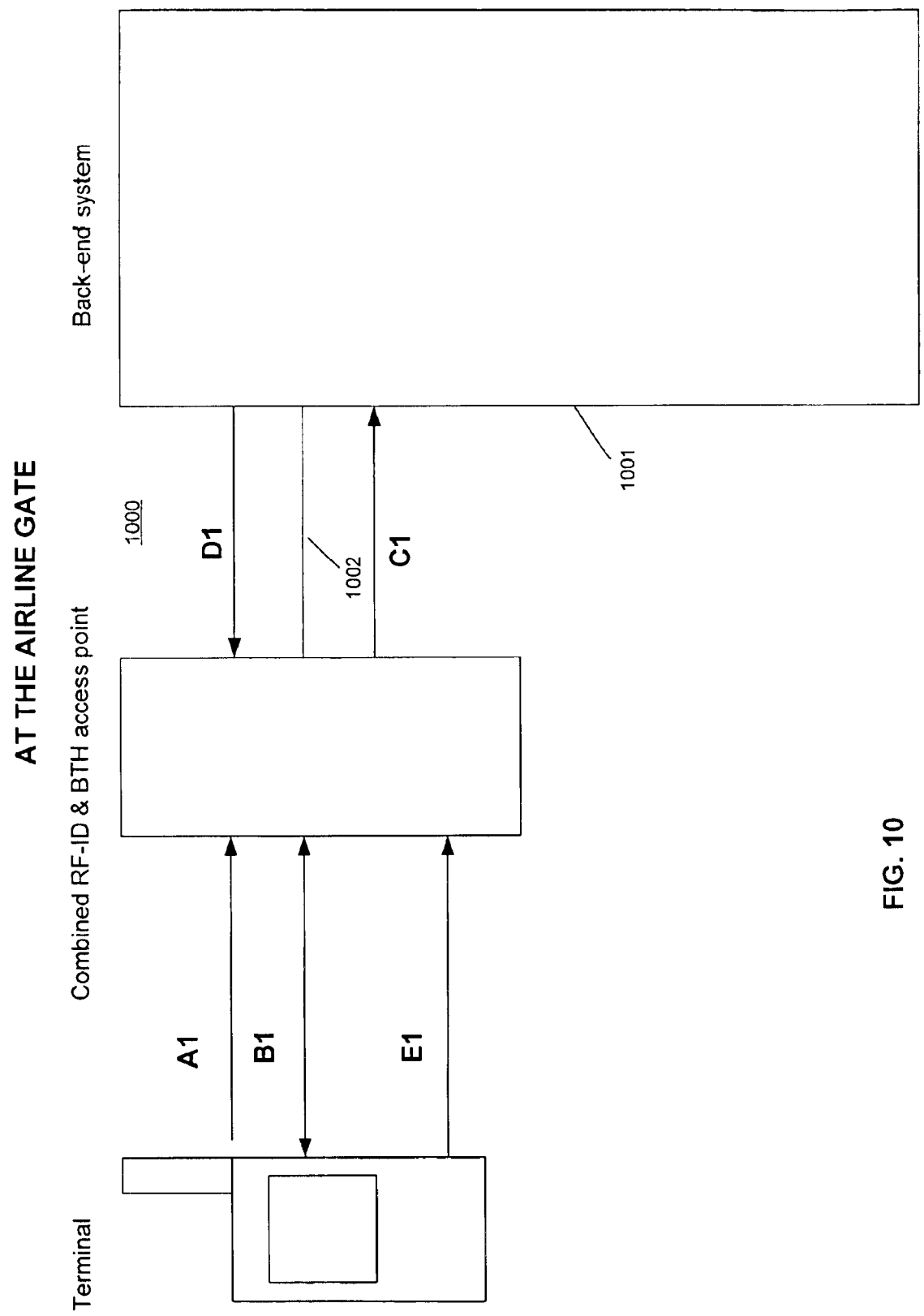
FIG. 10 is a representation of a process providing a user with flight information at an airline gate, using the system of FIG. 1, according to one embodiment of the invention.

FIG. 10 is a second scenario for a Bluetooth terminal user at an airline gate scenario according to one embodiment of the invention.

In step A1, the Bluetooth terminal serial number and passenger card number are transferred to the access point using RF-ID technology, either inductive coupling or electromagnetic wave propagation coupling.

In step B1, a Bluetooth session setup is established between the access point and the terminal using the terminal's Bluetooth serial number.

In step C1, the user's passenger card information is transferred to a back-end system 1001 via a connection 1002.

In step D1, the back-end system opens the gate, based upon passenger card information, and In step E1, the airline backend system sends the user personalized information about flight and destination via the access point-terminal session. Alternatively, the airline backend system may be adapted to serve as an access point enabling the terminal to interact directly with the backend system after establishing a session based upon inductive or electromagnetic wave propagation coupling of the terminal tag and clock information to the backend system.

Summarizing, the present invention describes a method and system for establishing a fast wireless connection between a terminal and a service application using RF-ID connectionless communication between the terminal and a RF-ID reader/access point. The terminal transmits user and terminal identification plus terminal clock information to the reader/access point using inductive or electromagnetic wave propagation coupling. The access point, which can also be another mobile terminal, uses the terminal identification and clock information to establish a wireless connection to the terminal using a paging operation in lieu of an inquiry or discovery operation, the later shortening session set-up time and user identification by eliminating the random backup time and slave master switch time which would otherwise be required in an inquiry or discovery process in establishing a wireless connection between the terminal and the access point. The invention is applicable to Bluetooth and other wireless standards.

While the invention has been described in a preferred embodiment, various changes can be made within the skill of a worker skilled in the without departing from the spirit and scope of the present invention, as defined in the appended claims, in which,

We claim:

1. A wireless terminal with shortened session set-up and identification time, comprising:
    a. a processing unit coupled with a short range transceiver for controlling communication via a first short range radio link having a first link range; and
    b. an RF-ID tag operating within a second short range radio link for receiving an interrogation signal and instantly transmitting terminal identification information via the second short range radio link having a second link range for immediate connection purposes, wherein the transmitted terminal identification information includes clock information and a unique identification number of the wireless terminal and is used for instantly establishing a wireless short range communication connection having a shortened session set-up time with a remote transceiver communicating on the first short range radio link by skipping a device discovery process during said wireless short range communication connection establishment.

2. The wireless terminal of claim 1, further comprising:
    c. a network transceiver having a third link range coupled with the processing unit for interacting with a mobile communication network.

3. The wireless terminal of claim 1, further comprising:

c. an input/output apparatus for displaying information transmitted/received to/from the remote transceiver via the first short-range radio link.

4. The wireless terminal of claim 1, wherein the short-range transceiver conforms the principles of the Bluetooth technology without an inquiry process and the first short-range radio link is a Bluetooth link.

5. The wireless terminal of claim 4, wherein the terminal identification information comprises a Bluetooth serial number of the wireless terminal.

6. A wireless terminal with shortened session set-up and identification time, comprising:

a. a processing unit coupled with a short range transceiver for controlling communication via a first short range radio link having a first link range;

b. an RF-ID tag operating within a second short range radio link for receiving an interrogation signal and instantly transmitting terminal identification information via the second short range radio link having a second link range for immediate connection purposes, wherein (1) the transmitted terminal identification information is used for instantly establishing a wireless short range communication connection having a shortened session set-up time with a remote transceiver communicating on the first short range radio link by skipping a device discovery process during said wireless short range communication connection establishment, and wherein the RF-ID tag comprises:

a. an ID transponder for transmitting the terminal identification information and clock information via the second short range radio link; and b. a connection to a tag memory coupled with the ID transponder for storing and providing the terminal identification information and the clock information to the ID transponder.

7. The wireless terminal of claim 6, wherein the ID transponder further comprises:

a. an interrogation module for receiving energy from the interrogation signal; and b. a responder module for generating and transmitting the terminal identification information and the clock information via the second short range radio link.

8. The wireless terminal of claim 7, wherein the ID transponder is a radio frequency ID transponder and conforms the principles of the RF-ID technology.

9. The wireless terminal of claim 6, wherein the RF-ID tag is a passive tag.

10. The wireless terminal of claim 6, wherein the RF-ID tag further comprises a data bus between the RF-ID tag and the processing unit for periodically updating terminal identification and clock information.

11. A wireless terminal with shortened session set-up and identification time, comprising:

a. a processing unit coupled with a short range transceiver for controlling communication via a first short range radio link having a first link range; and b. an RF-ID tag operating within a second short range radio link for receiving an interrogation signal and instantly transmitting terminal identification information via the second short range radio link having a second link range for immediate connection purposes, wherein (1) the transmitted terminal identification information is used for instantly establishing a wireless short range communication connection having a shortened session set-up time with a remote transceiver communicating on the first short range radio link by skipping a device discovery process during said wireless short range communication connection establishment, and (2) the RF-ID tag is a semi-passive tag for writing into and reading from.

12. The wireless of claim 11 wherein the semi-passive RF-ID tag activates a second transceiver module in the wireless terminal in response to receiving the interrogation signal.

13. The wireless terminal of claim 11, wherein the terminal identification information includes a Bluetooth serial number of the wireless device, and Bluetooth Clock Offset information of the wireless terminal.

14. The wireless terminal of claim 11, wherein the wireless connection enables the wireless terminal to conduct transactions with a service application linked with the remote transceiver communicating on the first short-range radio link.

15. The wireless terminal of claim 11, wherein the wireless terminal is a handheld mobile terminal.

16. The wireless terminal of claim 15, wherein the handheld mobile terminal is a mobile phone.

17. A wireless terminal with shortened session set-up and identification time, comprising:

a. a processing unit coupled with a short range transceiver for controlling communication via a first short range radio link having a first link range;

b. an RF-ID tag operating within a second short range radio link for receiving an interrogation signal and instantly transmitting terminal identification information via the second short range radio link having a second link range for immediate connection purposes, wherein the transmitted terminal identification information is used for instantly establishing a wireless short range communication connection having a shortened session set-up time with a remote transceiver communicating on the first short range radio link by skipping a device discovery process during said wireless short range communication connection establishment; and a RF-ID reader coupled with the processing unit for communicating with remote RF-ID tags and updating tag information.

18. The wireless terminal of claim 17, wherein the RF-ID reader communicates with the remote RF-ID tags by transmitting an interrogation signal via the second short range radio link and receiving a response signal including remote terminal identification information.

19. The wireless terminal of claim 18, wherein the received remote terminal identification information is used for establishing a wireless connection having a shortened session set-up time by the short range transceiver communicating via the first short range radio link with a remote transceiver linked with the remote terminal identification information communicating on said first short range radio link.

20. The wireless terminal of claim 19, wherein the short-range transceiver conforms the principles of the Bluetooth technology and the first short-range radio link is a Bluetooth link.

21. The wireless terminal of claim 17 wherein the R F-ID reader conforms the principles of the RF-ID technology.

22. A system for shortening session set-up and identification time in wireless short range communication, comprising:

a. a first terminal equipped with a first short range transceiver operating on a first short range radio link having a first link range, and an RF-ID tag operating on a second short range radio link having a second link range, and adapted to transmit at least terminal identification information of the first terminal;
b. a RF-ID reader for transmitting an interrogation signal via the second short range radio link for rapidly detecting the RF-ID tag in the first terminal and receiving the at least terminal identification information transmitted by the RF-ID tag of the first terminal in response to said interrogation signal, and
c. a second terminal coupled with the RF-ID reader equipped with a second short range radio transceiver module operating on the first short range radio link for establishing a wireless short range connection with the first terminal in a shortened session set-up time using the at least terminal identification information transmitted by the RF-ID tag of the first terminal by skipping a device discovery process during said wireless short range communication connection establishment, wherein the terminal identification and clock information of the first terminal further includes a unique identification number of the first terminal.

23. The system of claim 22, wherein the first and the second transceiver modules conform the principles of the Bluetooth technology and the first short range radio link is a Bluetooth link.

24. A system for shortening session set-up and identification time in wireless short range communication, comprising:
a. a first terminal equipped with a first short range transceiver operating on a first short range radio link having a first link range, and an RF-ID tag operating on a second short range radio link having a second link range, and adapted to transmit at least terminal identification information of the first terminal;
b. a RF-ID reader for transmitting an interrogation signal via the second short range radio link for rapidly detecting the RF-ID tag in the first terminal and receiving the at least terminal identification information transmitted by the RF-ID tag of the first terminal in response to said interrogation signal; and
c. a second terminal coupled with the RF-ID reader equipped with a second short range radio transceiver module operating on the first short range radio link for establishing a wireless short range connection with the first terminal in a shortened session set-up time using the at least terminal identification information transmitted by the RF-ID tag of the first terminal by skipping a device discovery process during said wireless short range communication connection establishment, wherein (1) the terminal identification and clock information of the first terminal further includes a unique identification number of the first terminal, and (2) the terminal identification and clock information of the first terminal further comprises a Bluetooth serial number of the first terminal.

25. The system of claim 24 wherein the RF-ID tag comprises:
a. an ID transponder for transmitting the terminal identification and clock information via the second short range radio link; and
b. a connection to a tag memory coupled with the ID transponder for storing the terminal identification and clock information and for providing said terminal identification and clock information to the ID transponder.

26. The system of claim 25, wherein the ID transponder is a radio frequency ID transponder and conforms the principles of the RF-ID technology.

27. The system of claim 24, wherein the ID transponder further comprises:
a. an interrogation module for receiving energy from the interrogation signal; and
b. a responder module for generating and transmitting the terminal identification information and clock information via the second short range radio link.

28. The system of claim 24 wherein the RF-ID tag is a passive tag.

29. A wireless terminal with shortened session set-up and identification time, comprising:
a. a processing unit coupled with a short range transceiver for controlling communication via a first short range radio link having a first link range;
b. an RF-ID tag operating within a second short range radio link for receiving an interrogation signal and instantly transmitting terminal identification information via the second short range radio link having a second link range for immediate connection purposes, wherein the transmitted terminal identification information is used for instantly establishing a wireless short range communication connection having a shortened session set-up time with a remote transceiver communicating on the first short range radio link by skipping a device discovery process during said wireless short range communication connection establishment; and
c. a data bus between the RF-ID tag and the processing unit for periodically updating terminal identification and clock information.

30. The system of claim 29, wherein the RF-ID tag is a semi-passive tag.

31. The system of claim 30, wherein the semi-passive RF-ID tag activates the second transceiver module in the first terminal in response to receiving the interrogation signal.

32. The system of claim 29, wherein the terminal identification information includes a Bluetooth serial number of the wireless device, and Bluetooth Clock Offset information of the wireless terminal.

33. The system of claim 29, wherein the first terminal is a handheld mobile terminal.

34. The system of claim 33, wherein the handheld mobile terminal is a mobile phone.

35. The system of claim 29, wherein the second terminal is a handheld mobile terminal.

36. The system of claim 35, wherein the handheld mobile terminal is a mobile phone.

37. The system of claim 35, wherein the second terminal is a stationary access point connected to a communication network enabling the first terminal to conduct transactions with service applications within the communication network via the access point through the established short range wireless connection in a shortened session set-up time.

38. The system of claim 37, wherein the communication network is Internet.

39. A method for shortening session set-up and identification time in wireless short range communication, comprising the steps of:
a. incorporating within an RF-ID tag operating on a first short range radio link having a first link range physically proximate to a first terminal at least a portion of a terminal identification information of the first terminal;
b. maintaining the at least portion of the terminal identification information of the first terminal within the RF-ID tag;

c. moving the first terminal and the RF-ID tag physically proximate to said first terminal into a coverage area of an RF-ID reader operating on the first short range radio link;

d. transmitting instantly the at least portion of the terminal identification information of the first terminal by the RF-ID tag via the first short range radio link in response to an interrogation signal transmitted by the RF-ID reader;

e. forwarding the received at least portion of the terminal identification information of the first terminal to a second terminal connected to the RF-ID reader; and f. establishing a wireless short range connection having shortened session set-up time without conducting a device discovery process between the first terminal and the second terminal through a second short range radio link having a second link range using the at least portion of the terminal identification information of the first terminal, wherein step (b) further comprises periodically updating the at least portion of the terminal identification information of the first terminal.

40. The method of claim 39, wherein the second short-range radio link is a Bluetooth link conforming the principles of Bluetooth technology.

41. The method of claim 39, wherein the first radio link conforms the principles of the RF-ID technology.

42. The method of claim 39, wherein the RF-ID tag is a passive tag.

43. The method of claim 39, wherein the RF-ID tag is a semi-passive tag.

44. The method of claim 39, wherein the terminal identification information of the first terminal includes a Bluetooth serial number of the first terminal and Bluetooth Clock Offset information of the first terminal.

45. The method of claim 39, wherein the first terminal is a handheld mobile terminal.

46. The method of claim 39, wherein the handheld mobile terminal is a mobile phone.

47. The method of claim 39, wherein the second terminal is a handheld mobile terminal.

48. The method of claim 47, wherein the handheld mobile terminal is a mobile phone.

49. The method of claim 39, wherein the second terminal is a stationary access point connected to an infrastructure network enabling the first terminal to conduct transactions with service applications within the communication network via the access point through the established wireless short range connection in a the shortened session set-up time.

50. The method of claim 49, wherein the infrastructure network is the Internet.

51. The method of claim 39, wherein the RF-ID tag is incorporated in the first terminal.

52. The method of claim 39, wherein the RF-ID reader is incorporated in the second terminal.

53. A method for providing interactive services with shortened session set-up and identification time in short range radio communication, comprising a. transmitting at least identification information of a mobile communications terminal via an RF-ID radio link in response to an interrogation signal sent by an RF-ID reader;

b. forwarding by the RF-ID reader, the at least identification information of the terminal to an access point; and c. receiving by the mobile communications terminal a service notification message from the access point via a short range radio link, wherein the short range radio link is a Bluetooth radio link and the at least identification information of the mobile communications terminal comprises a unique Bluetooth serial number of the terminal and a Bluetooth clock offset information of the terminal.

54. The method of claim 53, wherein step (f) further comprises:

a. transmitting by the second terminal a paging message via the second short range radio link to the first terminal including the at least portion of the identification information of the first terminal;

b. transmitting a page response message to the second terminal by the first terminal; and c. establishing the wireless connection for communication purposes between the first terminal and the second terminal.

55. The method of claim 53, wherein the at least portion of the terminal identification information of the first terminal includes a unique identification number of the first terminal.

56. The method of claim 55, wherein the at least portion of the terminal identification information of the first terminal comprises a Bluetooth serial number of the first terminal.

57. A medium, executable in a computer system for 80 for providing interactive services with shortened session set-up and identification time in short range radio communication, the medium comprising a. program code for transmitting at least identification information of a mobile communications terminal via an RF-ID radio link in response to an interrogation signal sent by an RF-ID reader;

b. program code for forwarding by the RF-ID reader, the at least identification information of the terminal to an access point; and c. program code for receiving by the mobile communications terminal a service notification message from the access point via a short range radio link, wherein the short range radio link is a Bluetooth radio link and the at least identification information of the mobile communications terminal comprises a unique Bluetooth serial number of the terminal and a Bluetooth clock offset information of the terminal.

58. A method for providing interactive services with shortened session set-up and identification time in Bluetooth communication, comprising:

a. installing at least a Bluetooth serial number and credit card information in a Bluetooth terminal;

b. transferring at least the Bluetooth serial number and credit card information to a RF-ID/Bluetooth access point using RF-ID technology;

c. establishing a Bluetooth session by:
   (i) conducting Bluetooth paging by the access point using at least the Bluetooth serial number to open a Bluetooth connection;
   (ii) responding to the paging by the terminal to establish the Bluetooth session;

d. transmitting a PIN number request to the terminal by the access point wherein the request contains information about a transaction with a service application;

e. transmitting the PIN number to the access point; and f. transferring the PIN number to the service application for completion of a transaction.

59. The method of claim 58, further comprising g. providing a user with information and operating equipment by the service application in response to the PIN number enabling the user to achieve the services available from the service application.

* * * * *

UNITED STATES PATENT AND TRADEMARK OFFICE
CERTIFICATE OF CORRECTION

PATENT NO. : 6,892,052 B2
DATED : May 10, 2005
INVENTOR(S) : Kotola et al.

It is certified that error appears in the above-identified patent and that said Letters Patent is hereby corrected as shown below:

Title page,
Item [75], Inventors, should read -- Sakari Kotola, Kauniainen (FI); Holger Hussmann, Tampere (FI) --.

Signed and Sealed this

Twenty-seventh Day of December, 2005

JON W. DUDAS
*Director of the United States Patent and Trademark Office*